Feb. 8, 1944.   R. S. BOHANNAN   2,341,174
HYDRAULIC SCALE
Original Filed Aug. 3, 1938   2 Sheets-Sheet 2
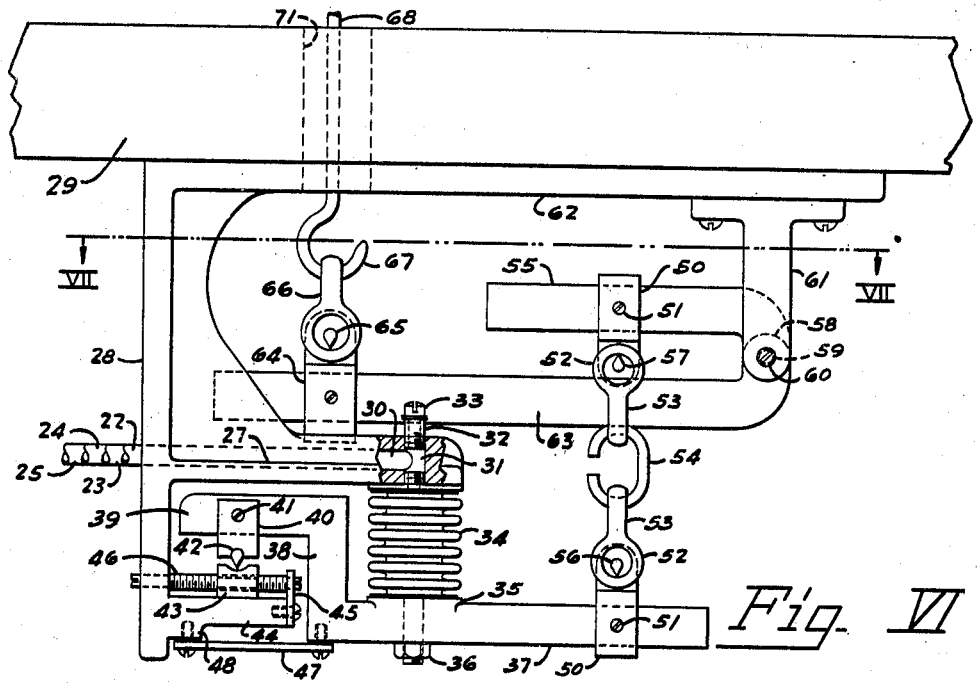
Fig. VI
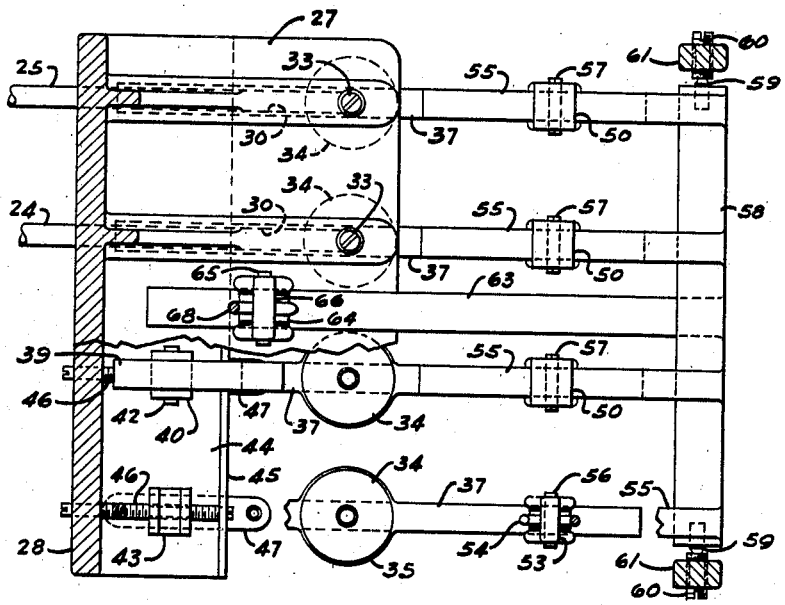
Fig. VII
Robert S. Bohannan
INVENTOR
BY Marshall & Marshall
ATTORNEYS Patented Feb. 8, 1944

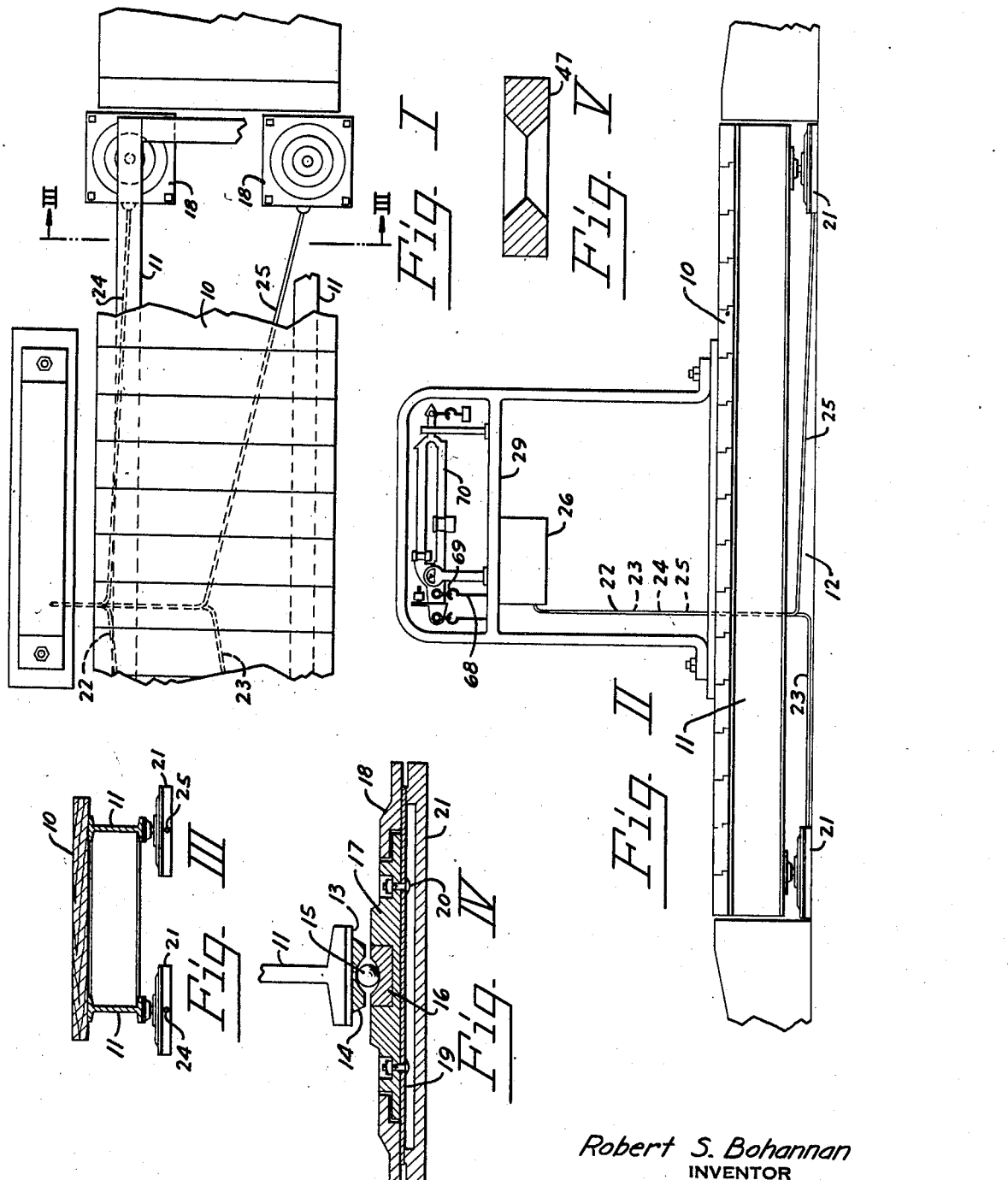

2,341,174

UNITED STATES PATENT OFFICE 2,341,174

HYDRAULIC SCALE

Robert S. Bohannan, Toledo, Ohio, assignor to Toledo Scale Company, Toledo, Ohio, a corporation of New Jersey Continuation of application Serial No. 222,831, August 3, 1938. This application December 19, 1941, Serial No. 423,592

9 Claims. (Cl. 265—47)

My invention relates to hydraulic scales wherein the load is transmitted by fluid pressure through a plurality of independent ducts to an equalizing and compensating mechanism which actuates the scale beam or any equivalent meter or value indicator for the scale load, and this application is a continuation of application Serial No. 222,831, filed August 3, 1938.

My invention is more particularly concerned with the perfecting of mechanism whereby, regardless of any off-center position of a load on the scale platform, or its equivalent, the hydraulic pressure transmitted by such load through the several ducts to the compensating mechanism will exert a like pull on the scale beam.

It is one object of my invention to transmit to the scale beam the sum of the force, applied by the load at the same time to the several hydraulic fluid columns, through separate leverage transmissions to a common mechanical compensator, provision being made through the adjustment of each transmission to cause an equal pull to be exerted on the beam by a given load in different corresponding positions on the scale platform.

My invention further contemplates the employment of a double adjustment for the control of each leverage transmission which actuates the compensator, one adjustment being by means of knife edge bearings that are slidable along a pair of parallel spaced cooperating levers, and the other being by means of a screw controlled shifting of a knife edge bearing forming the fulcrum for one of the levers of each pair of cooperating levers.

My invention further comprises the use of a compensator in the form of a rocker bar carrying a lever of each leverage transmission and the lever for actuating the beam.

My invention further comprises novel features in the design of the component levers of each leverage transmission, and also in the design of check rods used to hold the levers having adjustable fulcrums against displacement.

My invention further comprises the novel details of construction and arrangement of parts which, in their preferred embodiment only, are illustrated in the accompanying drawings, in which:

Fig. I is a fragmentary plan view of a scale with its platform broken away and two of its diaphragms exposed at one end.

Fig. II is a view in elevation of the complete scale illustrated in Fig. I.

Fig. III is a transverse cross-sectional view taken on the line III—III, Fig. I.

Fig. IV is an enlarged vertical cross-sectional view through one of the platform diaphragms.

Fig. V is an enlarged cross-sectional view showing the knife edge bearing at one end of the check rod.

Fig. VI is an enlarged view in side elevation of the mechanism in the compensator cabinet shown under the beam on the scale stand in Fig. II.

Fig. VII is a cross-sectional view taken on the line VII—VII of Fig. VI, with the intermediate partition broken away and certain of the levers shown in plan and partly broken away.

Similar reference numerals refer to similar parts throughout the drawings.

In the embodiment of my invention illustrated herein, I have shown same associated with a truck scale. It will be understood that the scale platform 10 may be of any size and shape according to the particular duty required of the scale, and it may be adapted to receive trucks, railway cars, or it may conform to the standard designs in use for small platform scales.

The platform as illustrated has its decking supported by longitudinal deck girders 11 of I-beam design with base flanges which at their ends rest upon corner diaphragms. These diaphragms are separately mounted in the corners of the platform pit 12 and in their preferred embodiment each comprises a top plate 13, bolted or otherwise secured to the base of its respective I-beam 11 and provided beneath with a centrally disposed concave socket 14 adapted to receive a ball 15 seated in correspondingly socketed bearing block 16, mounted centrally on the thrust plate 17. This plate 17 is guided for limited vertical play in the top ring 18, which, underneath is rabbeted to receive the marginal flange of the plate 17. A flexible diaphragm 19, of any suitable material, is connected by bolts 20, or any equivalent means, to the plate 17 and its marginal edges are confined between the ring 18 and the chambered base plate 21 of the diaphragm assembly. The chamber below the diaphragm is filled with any suitable fluid, preferably such that will not evaporate, and will have a low coefficient of expansion and a very low freezing point. This fluid body under each diaphragm 19 is connected by means of a separate duct to the beam operating mechanism. These ducts, respectively numbered 22, 23, 24 and 25 to distinguish them, are carried in any suitable manner through the pit 12 to a point where they can pass up and enter the compensator cabinet 26. As shown in Fig. VII the end of each of these ducts in the cabinet is screwed into a separate threaded port leading through the side wall 28 into the horizontal partition 27 forming parts of a metal frame mounted within the cabinet and bolted overhead to the transverse frame member 29 of the beam stand. This partition 27 is enlarged to form each of the ports 30, the bore of which extends only partly therethrough with its inner end intersected by a vertical bore 31 leading through the partition and having threads tapped in its upper and lower ends. The upper end of each bore 31 is closed by a nipple 32 through which the system is filled with hydraulic fluid and which is in turn closed by a screw cap 33. The lower end of each bore 31 has a screw connection opening through the upper head of a bellows 34. The lower head closing each bellows is made fast to a seat 35 by a screw stud 36 which passes through its respective lever 37 and seat 35 and secures the bellows thereto.

Where four platform diaphragms are employed there will be four of the hydraulic fluid columns, four of the bellows 34 and four of these transmitting levers 37. All of these corresponding parts will be similar and thus can be stocked in duplicate.

Each transmitting lever 37 has at one end an upturned portion 38 and a horizontal bearing end 39 parallel with the transmitting end 37 of the lever. A slide bearing block 40 is adjustably connected by means of a set screw 41 with the bearing end 39 of each of said transmitting levers and it has seated fast in its under-face, in a plane normal to the lever, a knife edge bearing block 42. This bearing is engaged in a grooved seat provided in a lower bearing block 43 which is supported on a sub-platform 44 under, and in spaced relationship to, the partition 27. The upper surface of this sub-platform 44 is horizontal and it extends the full width of the metal frame in the compensator. An end plate 45 is suitably attached to the free edge of this platform and rises above it and is bored to receive the reduced inner ends of four adjusting screws 46 which are screwed in the end of the cast frame and project beyond same, and if desired outside of the cabinet so as to be readily accessible for adjustments.

Each transmitting lever 37 is connected by a check rod 47 to a shoulder 48 below the sub-platform by means of screws engaged in said shoulder and in the adjacent end of the lever 37, these rods 47 having the holes for the screws larger in diameter than the shanks of the screws and machined to provide a knife edge as seen in Fig. V, so that they will not, by binding against their respective screws, check or restrain the free vertical play of their respective levers 37. A nose iron 50 is fitted slideably over the free end of each lever 37 and is adapted to be set in any desired adjustment thereon by its respective set screw 51. The upper end of the nose iron is fitted between the side members 52 of a loop 53, the upper end of which is engaged over a C-link 54 which overhead is connected by duplicate elements 50, 51, 52 and 53 to a rocker arm 55, each substantially parallel with its respective lever 37. Each of the nose irons of a link connection has a knife edge bearing block 56 or 57 engaging its respective loop 53, these bearings being relatively inverted as shown in Fig. VI.

All four of the rocker arms 55 are rigidly connected to a horizontal rocker bar 58 having end bearing points 59 which center it and support it practically free of friction in seats formed at inner ends of screw bearings 60 which are carried by brackets 61 bolted to the top 62 of the metal frame in the compensator cabinet 26. These four rocker arms 55 are equally spaced along and rise from the upper portion of the rocker bar 58. In its center, and connected in under-hung relation thereto, is an elongated pull lever 63 which is disposed parallel with the rocker arms 55 and projects into position to receive a nose iron 64 connected by knife edge bearing block 65 to the arms of loop 66 which is engaged over the hook 67 on the pull bar 68 leading up, and connected by an upper hook 69, to the loop by which the pull is applied to the scale beam or other load counterbalancing mechanism generally designated by the numeral 70. This beam carries the usual sliding weights, counterweights and the adjusting weights, all of which being of standard design and construction need not be specifically designated herein. The pull bar 68 passes through an opening 71 leading through the top frame member 62 in the compensator cabinet and through the transverse member 29 of the beam stand, the hole being large enough to permit a certain amount of adjustment to the nose iron 64 on the pull lever 63, which is adapted to be set in adjusted position by a set screw.

The scale and beam stand elements having all been assembled and the joints made tight connecting the fluid ducts to the diaphragms and to the compensator ports with which they are respectively connected, the operation of the scale may be thus described:

The load on the platform will depress all of the platform diaphragms but force will not be applied to all the diaphragms in an equal degree unless the load be centered on the scale platform. The force applied by the load, whatever its position on the platform, to the several platform diaphragms will be separately transmitted from each diaphragm to its respective bellows 34 and each bellows will be expanded in direct proportion to the force applied to the fluid column controlling it. The expansion of the several bellows will be away from their upper seats where they are connected to the partition 27, and thus each will force downwardly its respective actuating lever 37. Such lever will rock on its fulcrum knife edge bearing 42, 43 and its free end, through the connection described, will impart a pull downward to its respective lever 55 on the common rocker bar 58. A downward movement of such lever 55 is resisted by the upward pull from the rod 68 exerted by the balance weights of the scale beam. Therefore, the rocking motion imparted to the rocker bar 58 by the combined thrust from the four bellows 34 through their respective actuating levers 37 will be transmitted through the pull lever 63 of the rocker bar to the pull rod 68 that operates the scale beam.

The equalization of the transmission pull from different parts of the platform is attained by placing a standard weight in corresponding position in each corner of the scale platform and adjusting the connections in the compensator cabinet 26 so that for each position of the weight, the scale beam will read alike.

The original rough adjustment to "seal out" each corner of the scale is made by loosening the set screws 51 and by bodily shifting the linkage between the individual lever 37 and the respective arm 55 of the common rocker bar 58. When the linkage has been so shifted that the weighing scale mechanism reacts approximately correctly to the amount of load on the corner in question, the set screws 51 are tightened in place. Care must be taken when shifting such linkage that the bellows lever 37 is maintained in such a position that the screws extending through the check rod 47 are approximately at the center of the apertures through which they extend. The set screw 41 may also be loosened and the block 40 shifted on the end 39 of the lever 37 to properly position the lever with respect to the rod 47. When the set screws 51 and set screw 41 are tightened, this tightening may shift slightly the connections between the respective members and the lever arms on which they are secured by the set screws. It also may be that the rough adjustment made by shifting these members is not accurate enough correctly to adjust the corner.

Fine adjustments, in order to "seal out" each individual corner, are made by turning the screw 46 which slides the block 43 and varies the condition of plumbness of the linkage connecting the lever 37 to the respective arm 55 of the rocker bar 58. It is, of course, impossible to detect by the eye whether the linkage is truly plumb, and the load counterbalancing mechanism of the scale itself is a much better indicator of the condition of the linkage associated with each corner of the scale (i. e., to show whether such corner is correctly "sealed out") than any means for gauging the respective positions of the transmission elements. By rotating the screw 46 and minutely adjusting the position of the block 43, the condition of plumbness of the linkage is varied. This varies the force which is applied through the linkage since the force applied thereby is different, depending upon whether the linkage is truly vertical or tilted to one side or the other.

It will be noted that in each transmission the cooperating lever 37 and rocker arm 55 occupy positions of substantial parallelism at all times and have their pivotal mountings at opposite ends. This is necessary to obtain the requisite adjustment of the leverage in the transmissions so that each may be caused to exert the exact effect desired on the scale beam. Thus, as the nose irons 50 of each transmission are shifted together to the right, Fig. VI, the force exerted by lever 37 diminishes and the same is true of the force exerted through the corresponding lever 55, thus there will be a diminution of the force transmitted by a bellows to the pull lever 63. When the nose irons are shifted to the left, the reverse is true. In like manner, as the fine adjustments are obtained by the shift of the fulcrum point for each lever 37, the force exerted through its respective nose irons is modified and by their exact adjustment throughout the several transmissions the correct force to be transmitted to the beam is obtained.

Obviously the forces exerted by the independent bellows 34 through their respective levers 37 and transmissions to the pull lever 63 will represent the sum of the force applied by the load to such bellows.

The scale beam, as herein referred to, is used as a comprehensive term representing any movable weight or value indicator such as a beam, dial or pointer, and in like manner the term platform as used is inclusive of any means to receive or support the load to be weighed, and the term diaphragm is inclusive of either the type supporting the platform or the bellows that actuates the leverage transmission.

While I have shown my invention in but one form, is will be obvious to those skilled in the art that it is not so limited, but is susceptible to various changes and modifications, without departing from the spirit thereof.

What I claim is:

1. In a hydraulic scale, a scale platform, supporting diaphragms therefor, a scale indicator, a rocker bar actuator for the indicator, a plurality of leverage transmissions each including a lever, which jointly operate said rocker bar actuator, a bellows operatively connected to the corresponding lever of each transmission and adapted to operate same, a fluid duct connecting each platform diaphragm with a corresponding bellows, means to fill each duct and that one of said diaphragms and said bellows connected thereby with a confined liquid body, means to vary the cooperative relation of the lever in each transmission to vary the effect of a given expansion of its respective bellows on said rocker bar actuator, and screw means to adjust the fulcrum for the lever in each transmission.

2. In a hydraulic scale, a scale platform, supporting diaphragms therefor, a scale indicator, a rocker bar actuator for the indicator, a plurality of leverage transmissions each including a lever, which jointly operate said rocker bar actuator, a bellows operatively connected to the corresponding lever of each transmission and adapted to operate same, a fluid duct connecting each platform diaphragm with a corresponding bellows, means to fill each duct and that one of said diaphragms and said bellows connected thereby with a confined liquid body, means to vary the cooperative relation of the lever in each transmission to vary the effect of a given expansion of its respective bellows on said rocker bar actuator, screw means to adjust the fulcrum for each bellows actuated lever, and check rods to restrain the levers with adjustable fulcrums from lineal movement.

3. In a hydraulic scale, in combination, a load receiver, load counterbalancing means, a plurality of pairs of expansible members, each pair comprising a diaphragm and a bellows and being independently connected by a duct, a body of liquid which fills and is confined within each duct and its respective expansible members, the diaphragms disposed at the ends of the ducts being adapted yieldably to support said load receiver, a plurality of leverage transmissions, each independently responsive to the expansion of same bellows at the other end of each duct and each transmission including a lever, means jointly operable by said transmissions for transmitting force to said load counterbalancing means, shiftable connections between said levers and said transmitting means whereby the force transmitted by each lever may be independently adjusted, each of said bellows being rigidly connected to the corresponding lever of said transmissions.

4. In a hydraulic scale, in combination, a load receiver, a movable weight indicator, a plurality of pairs of expansible members, each pair comprising a diaphragm and a bellows and being independently connected by a duct, a body of liquid which fills and is confined within each duct and its respective expansible members, the diaphragm disposed at one end of each duct being adapted yieldably to support said load receiver, a plurality of leverage transmissions, each independently responsive to the expansion of said bellows at the other end of each duct and rigidly connected thereto, actuating means jointly operable by said transmissions for actuating said indicator, each of said leverage transmissions comprising a lever and a substantially parallel cooperating arm of said actuating means fulcrumed at opposite ends and a connecting means slidable along said lever and arm to regulate the force transmitted to the indicator actuating means.

5. In a hydraulic scale, in combination, a scale platform, a plurality of diaphragm elements supporting said platform, a load counterbalance, a pivoted actuator therefor, a plurality of leverage transmissions which jointly operate said pivoted actuator, a bellows connected to each of said plurality of leverage transmissions for actuating said leverage transmissions, there being an element in each leverage transmission which is bodily shiftable to assume different operating positions in line with the leverage transmission pull to regulate its effect on the actuator, fluid ducts each connecting a platform supporting diaphragm with a corresponding bellows, and means to fill each pair of diaphragms and bellows and their respective ducts with a confined liquid body, each leverage transmission comprising a pair of substantially parallel levers, one attached to the pivoted actuator and the other having at its end remote from the axis of said pivoted actuator an adjustable fulcrum.

6. In a hydraulic scale, in combination, a load receiver, a movable weight indicator, a plurality of pairs of expansible members, each pair comprising a diaphragm and a bellows independently connected to each other by a duct, a body of liquid which fills and is confined within each duct and its diaphragm and bellows, the diaphragms disposed at the ends of the ducts be- adapted yieldably to support said load receiver, and a multiple transmission for actuating said indicator, said transmission being independently operable by each of said bellows and comprising fulcrum and transmitter elements associated with means to effect independent relative adjustments between said elements whereby relative leverage regulation is available to adjust the transmission, said fulcrum elements comprising levers each having one of said bellows rigidly connected intermediate its ends and independently adjustable pivots for said levers, said transmitter element comprising a common pivoted member having lever arms cooperating with said levers interposed between said indicator and said levers.

7. In a hydraulic scale, in combination, a scale platform, a plurality of diaphragm elements supporting said platform, a scale beam, a pivoted actuator therefor, a plurality of leverage transmissions which jointly operate said pivoted actuator, a bellows connected to each of said plurality of leverage transmissions for actuating said leverage transmissions, fluid ducts each connecting a platform diaphragm with a corresponding bellows, and means to fill each pair of diaphragms and bellows and their respective ducts with a confined liquid body, each transmission comprising a lever rigid with the pivoted actuator, a lever operable by its respective actuating bellows and an adjustable connection between the said levers in each transmission which comprises coupling links and interposed knife edge bearing blocks.

8. In a hydraulic scale, in combination, a load receiver, load counterbalancing mechanism, a plurality of diaphragms supporting said load receiver, a plurality of bellows, each of said diaphragms being connected by means of a duct to a separate one of said bellows, a plurality of levers, each of said bellows having an end seated upon a separate one of said levers, means pivotally mounting each of said levers for movement about an axis substantially perpendicular to the center line of that one of said bellows seated on said lever whereby said lever and the end of said bellows seated thereon are constrained to move only in a predetermined path, and means connecting each of said levers to said load counterbalancing mechanism.

9. In a hydraulic scale, in combination, a load receiver load counterbalancing mechanism, a plurality of diaphragms supporting said load receiver, a plurality of bellows, each of said diaphragms being connected by means of a duct to a separate one of said bellows, a plurality of levers, each of said bellows having an end seated upon a separate one of said levers, means pivotally mounting each of said levers for movement about an axis substantially perpendicular to the center line of that one of said bellows seated on said lever whereby said lever and the end of said bellows seated thereon are constrained to move only in a predetermined path, means connecting each of said levers to said load counterbalancing mechanism, and means for independently varying the force transmitted by each of said levers to said load counterbalancing mechanism.

ROBERT S. BOHANNAN.